US009509578B1

(12) United States Patent
Dixon et al.

(10) Patent No.: US 9,509,578 B1
(45) Date of Patent: Nov. 29, 2016

(54) METHOD AND APPARATUS FOR DETERMINING A TRANSACTION PARALLELIZATION METRIC

(71) Applicant: International Business Machines Corporation, Armonk, NY (US)

(72) Inventors: Scot W. Dixon, Manning (AU); Ian L. Gregor, Dianella (AU); Benjamin Hartnett, West Perth (AU); Mark N. Weatherill, Victoria Park (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/980,503

(22) Filed: Dec. 28, 2015

(51) Int. Cl.
  *G06F 15/173* (2006.01)
  *H04L 12/26* (2006.01)
  *G06F 11/30* (2006.01)
  *G06F 11/34* (2006.01)

(52) U.S. Cl.
  CPC ........... *H04L 43/04* (2013.01); *G06F 11/3006* (2013.01); *G06F 11/3409* (2013.01)

(58) Field of Classification Search
  None
  See application file for complete search history.

(56) References Cited

U.S. PATENT DOCUMENTS

| | | | | |
|---|---|---|---|---|
| 6,763,380 B1 * | 7/2004 | Mayton | ................... | H04L 41/14 709/223 |
| 7,818,418 B2 | 10/2010 | Bansal et al. | | |
| 8,209,415 B2 | 6/2012 | Wei | | |
| 8,479,204 B1 * | 7/2013 | Labonte | .............. | G06F 11/3419 718/100 |
| 8,966,450 B2 * | 2/2015 | Kunze | ....................... | G06F 8/62 717/126 |
| 2003/0144970 A1 * | 7/2003 | Coyne | .................... | G06Q 10/06 705/400 |
| 2004/0039728 A1 * | 2/2004 | Fenlon | ................ | H04L 12/2602 |
| 2008/0228690 A1 * | 9/2008 | Horovitz | ............... | H04L 69/163 706/48 |
| 2009/0240742 A1 * | 9/2009 | Burghard | ................ | G06F 9/466 |
| 2011/0098973 A1 | 4/2011 | Seidman | | |
| 2013/0047169 A1 * | 2/2013 | Gagliardi | ............ | G06F 11/3636 719/317 |
| 2013/0198722 A1 * | 8/2013 | Adams | ................ | G06F 11/3428 717/127 |
| 2014/0189097 A1 * | 7/2014 | Sidi | ....................... | H04L 43/045 709/224 |
| 2014/0259024 A1 | 9/2014 | Sridharan et al. | | |
| 2014/0280894 A1 | 9/2014 | Reynolds et al. | | |
| 2014/0310392 A1 * | 10/2014 | Ho | .......................... | H04L 69/16 709/223 |
| 2015/0199226 A1 * | 7/2015 | Wu | ....................... | G06F 11/079 714/37 |
| 2015/0281110 A1 * | 10/2015 | Chow | .................... | H04L 47/70 709/226 |

OTHER PUBLICATIONS

IBM: List of IBM Patents or Patent Applications Treated as Related (Appendix P), Dec. 29, 2015, pp. 1-2.

(Continued)

*Primary Examiner* — Joshua Joo
(74) *Attorney, Agent, or Firm* — Samuel A. Waldbaum (57) ABSTRACT

Embodiments of the present invention disclose a method, computer program product, and system for calculating an average parallelization metric. A tracking application receives tracking data that tracks how at least one server processes a plurality of transactions. Each of the plurality of transactions is comprised of a plurality of subtransactions. A parallelization metric is calculated for each of the plurality of transactions and an average parallelization metric is calculated from the calculated parallelization metrics. The parallelization metric for each transactions calculating using the calculated sum of the response times for all of the subtransactions for one transaction, the longest response time for one subtransaction out of response times for all of plurality of subtransaction that comprise the one transaction, and the calculated actual execution time for the transaction based on the time when the transaction starts to when the transaction has been completed.

18 Claims, 6 Drawing Sheets

(56) References Cited

OTHER PUBLICATIONS

U.S. Appl. No. 14/980,497, titled "Determining a Transaction Parallelization Improvement Metric," filed Dec. 28, 2015, pp. 1-47.
Tallent et al., "Effective Performance Measurement and Analysis of Multithreaded Applications," PPoPP '09, Proceedings of the 14th ACM SIGPLAN Symposium on Principles and Practice of Parallel Programming, Feb. 14-18, 2009, Raleigh, North Carolina, USA, ACM New York, NY, USA © 2009, pp. 1-11.
Mell et al., "The NIST Definition of Cloud Computing," National Institute of Standards and Technology, U.S. Department of Commerce, Special Publication 800-145, Sep. 2011, pp. 1-7.
Adhianto et al., "Hpctoolkit: Tools for performance analysis of optimized parallel programs", Concurrency and Computation: Practice and Experience, 2010, 00:1-7, Ver. 2002/09/19 v2.02, pp. 1-16.
Concurrent Inc., "Concurrent, Inc. Delivers the First Application Performance Management Product for Big Data Applications", Feb. 4, 2014, pp. 1-3, http://www.concurrentinc.com/2014/02/concurrent-inc-delivers-the-first-application-performance-management-product-for-big-data-applications/.
Manageengine, "Application Performance Management Tools for Enterprise", Whitepaper, printed on May 22, 2015, pp. 1-12, https://www.manageengine.com/products/applications_manager/application-performance-management-tools-html.

\* cited by examiner

METHOD AND APPARATUS FOR DETERMINING A TRANSACTION PARALLELIZATION METRIC

BACKGROUND

The present invention relates generally to computer performance, and more particularly to calculating a transaction parallelization metric using principles of statistics.

Application performance management is focused on monitoring applications and the application environments to determine the application's health and efficiency. Application performance management applications are able to monitor and predict application performance and/or monitor and determine application problems either in the application or in the environment in which the application runs. Application performance management collects several types of metrics from the application, for example, CPU usage, transaction rates, response times, thread pool usage, or other useful data.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for calculating an average parallelization metric. A tracking application receives tracking data that tracks how at least one server processes a plurality of transactions over a time frame. Each of the plurality of transactions is comprised of a plurality of subtransactions and the tracking data includes the response time for each of the plurality of substransactions, such that, each response time is measured from when the subtransaction is sent out to be proceed to when the processed subtransaction is returned. A parallelization metric is calculated for each of the plurality of transactions and an average parallelization metric is calculated from the calculated parallelization metrics. The tracking application displays the average parallelization metric to illustrate how well the tracked applications are working together. The parallelization metric for each transaction is calculated using the calculated sum of the response times for all of the subtransactions for one transaction, the longest response time for one subtransaction out of response times for all of plurality of subtransaction that comprise the one transaction, and the calculated actual execution time for the transaction based on the time when the transaction starts to when the transaction has been completed.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to the embodiments of the present invention, examples of which are illustrated in the accompanying drawings, wherein like reference numerals refer to like elements throughout. Embodiments of the invention are general directed to a system for determining a transaction parallelization metric. In one embodiment, a first server, a second server, a third server, and a fourth server each host an application that communicates with the others via transactions over a network. The server or the application includes a tracking module that tracks the communications, via a network, between the applications. The tracking data is analyzed to determine a level of transactional parallelization, and a parallelization metric is provided to a user.

Figure 1:
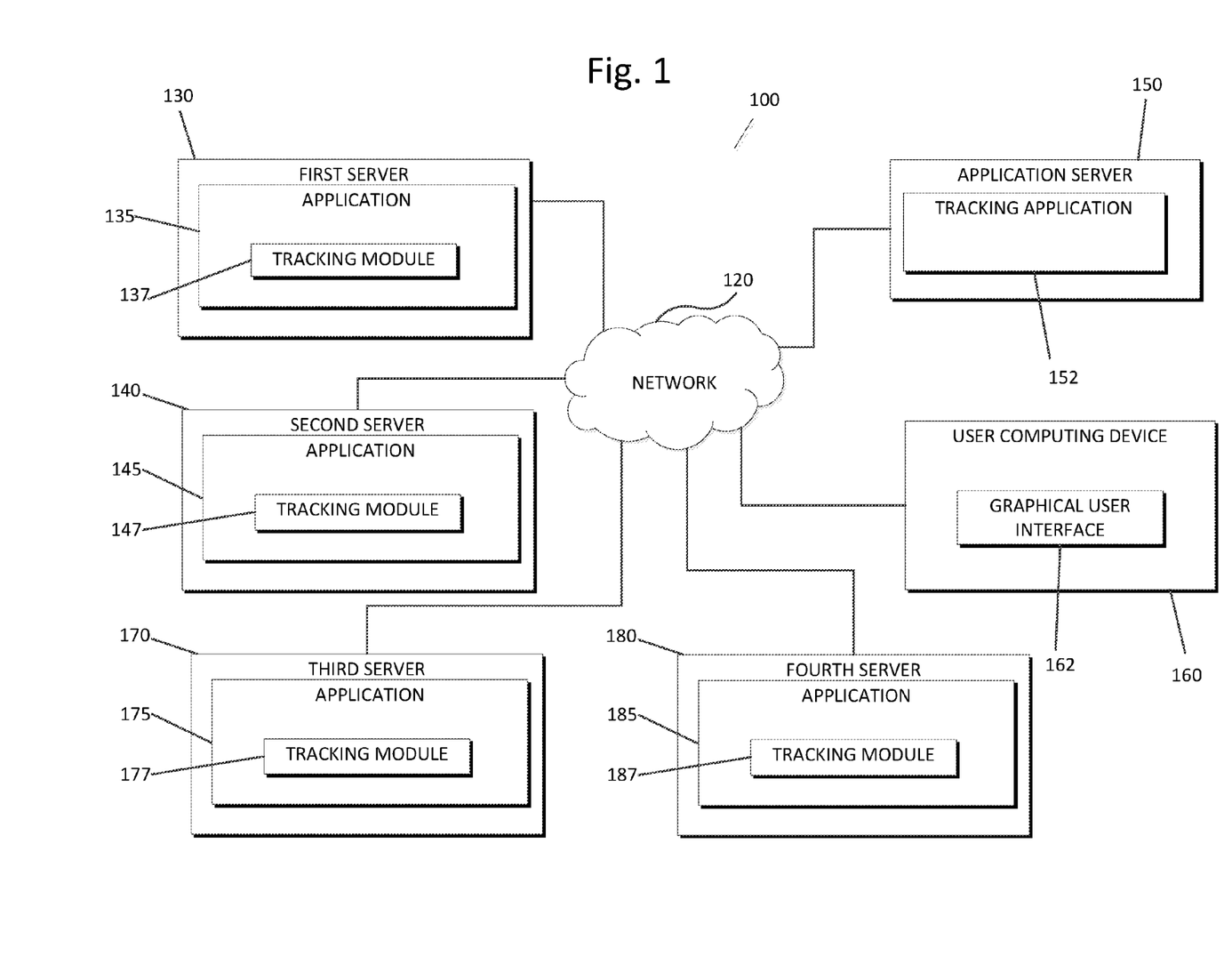
FIG. 1 is a functional block diagram determining a transaction parallelization metric, in accordance with an embodiment of the present invention.

FIG. 1 is a functional block diagram illustrating a system for determining a transaction parallelization metric 100, in accordance with an embodiment of the present invention. The system for determining the transaction parallelization metric 100 includes a first server 130, a second server 140, a third server 170, a fourth server 180, an application server 150, and a user computing device 160 that communicate with each other, via network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between the first server 130, the second server 140, third server 170, a fourth server 180, an application server 150, and the user computing device 160, in accordance with one or more embodiments of the invention.

Figure 5:
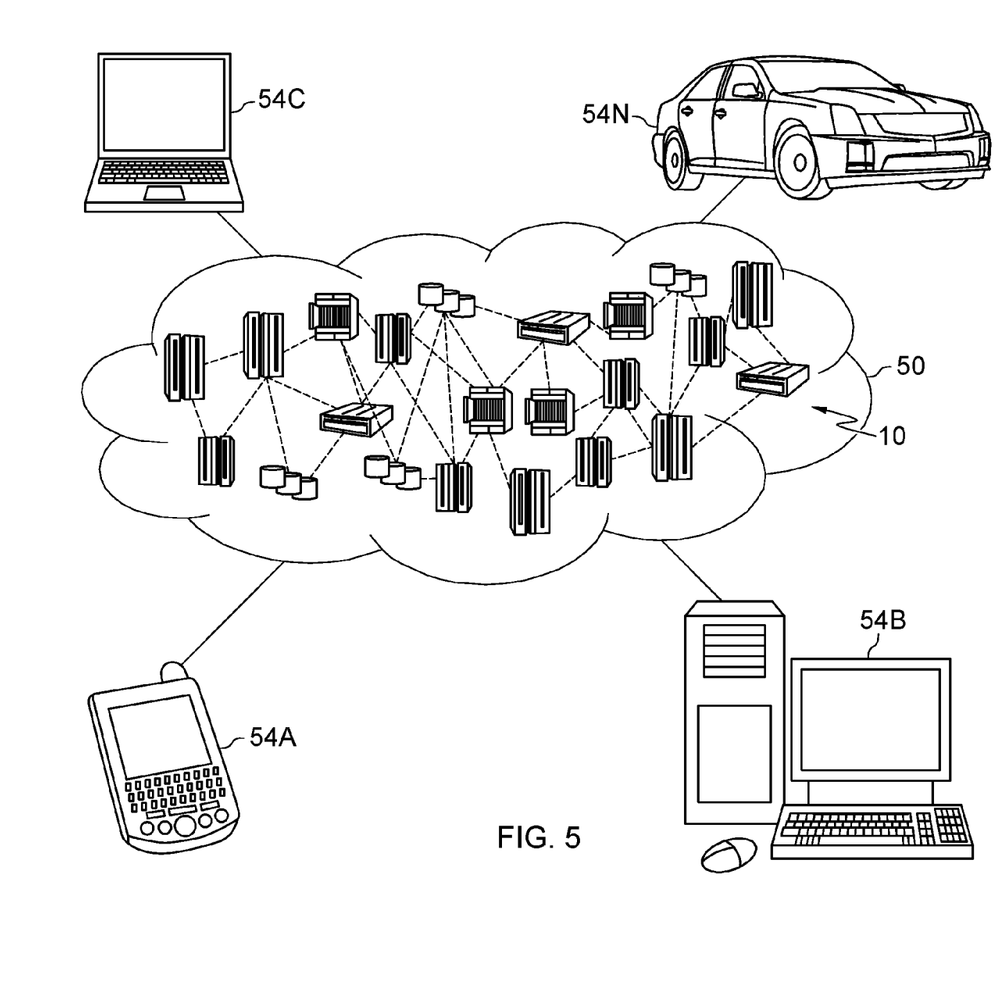
FIG. 5 depicts a cloud computing environment according to an embodiment of the present invention.
Figure 6:
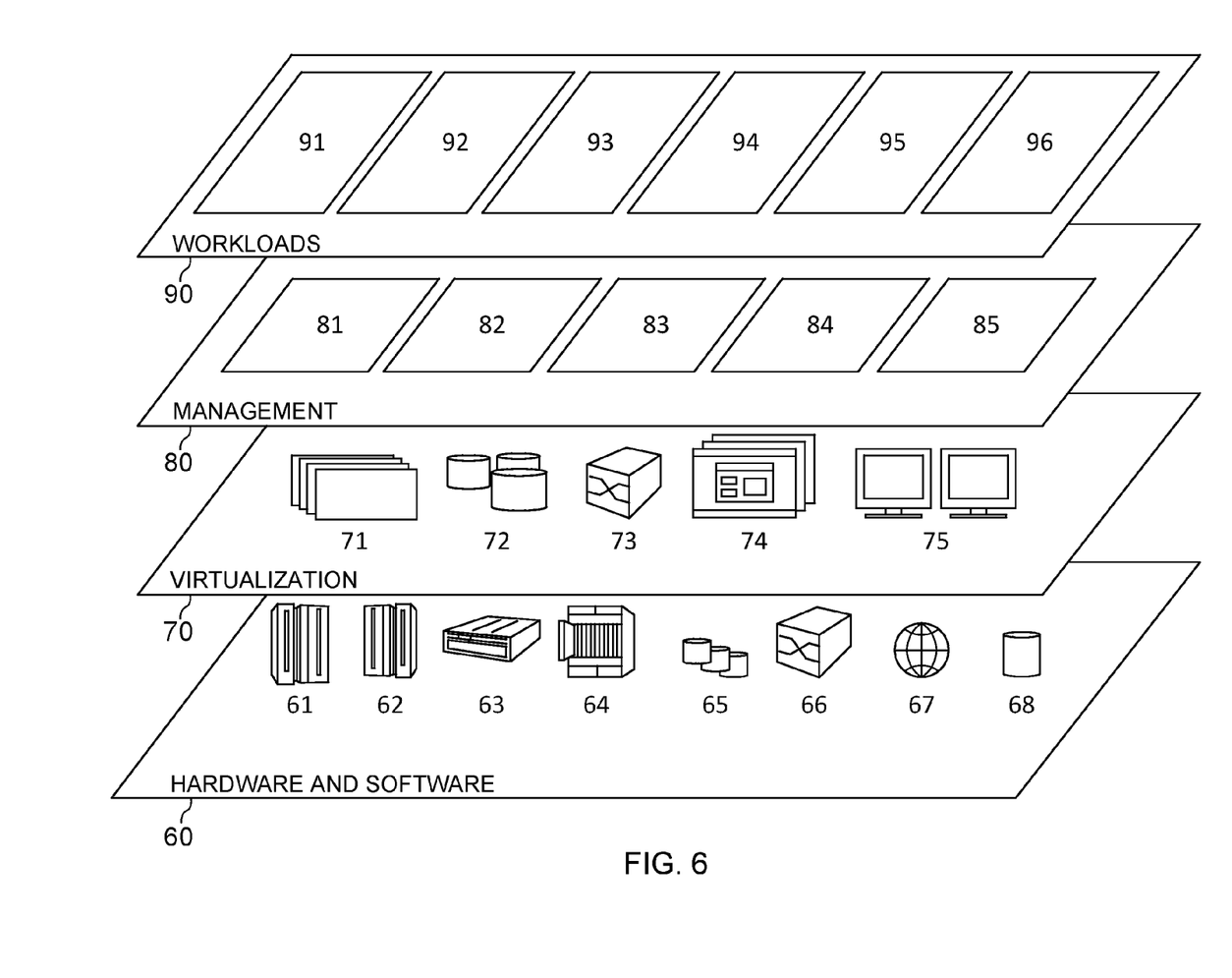
FIG. 6 depicts abstraction model layers according to an embodiment of the present invention.

The first server 130, the second server 140, the third server 170, and the fourth server 180 can be located at different locations or within the same server farm. Furthermore, the first server 130, the second server 140, the third server 170, and the fourth server 180 can be the same server and be considered different applications running simultaneously that require communication between the applications. The first sever 130, the second server 140, the third server 170, and the fourth server 180 may be any type of computing devices that are capable of connecting to network 120, for example, a laptop computer, tablet computer, netbook computer, personal computer (PC), a desktop computer, a smart phone, or any programmable electronic device supporting the functionality required by one or more embodiments of the invention. The first sever 130, the second server 140, the third server 170, and the fourth server 180 may include internal and external hardware components, as depicted and described in further detail below with respect to FIG. 4. In other embodiments, the first sever 130, the second server 140, the third server 170, and the fourth server 180 may operate in a cloud computing environment, as depicted in FIGS. 5 and 6.

The first server 130, the second server 140, the third server 170, and the fourth server 180 each include an application 135, 145, 175 and 185, respectively. Applications 145, 175, and 185 each communicate with application 135, via network 120, via transactions executing in applications 135, 145, 175 and 185. Applications 135, 145, 175, and 185 includes a tracking module 137, 147, 177, and 187 respectively, to track the transactional communications between the applications 135, 145, 175, and 185. The tracking modules 137, 147, 177, and 187 may be part of their respective applications 135, 145, 175, and 185, or the tracking module 137, 147, 177, and 187 may be part of a separate application or part of each server 130, 140, 170, and 180, respectively.

The tracking modules 137, 147, 177, and 187 tracks transactions that occur between applications 135, 145, 175, and 185. However, the tracking modules 137, 147, 177, and 187 are able to track any type of communications that might occur between applications 135, 145, 175, and 185. For example, the tracking modules 137, 147, 177, and 187 track the time at which they receive a transaction or send a completed transaction. The tracking modules 137, 147, 177, and 187 transmit the tracking data to a tracking application 152 on application server 150.

Application server 150 hosts the tracking application 152 that receives the tracking data from the tracking modules 137, 147, 177, and 187. The tracking application 152 analyzes the tracking data to determine an average parallelization metric for a plurality of transactions and/or a parallelization metric for one transaction and can analyze any other tracking data that might be relevant. The tracking application 152 transmits the analyzed tracking data to a user computing 160 to make the information accessible to a user. The user computing device 160 can be a separate computing device or can be part of application server 150. The application server 150 may include internal and external hardware components, as depicted and described in further detail below with respect to FIG. 4. In other embodiments, the application server 150 may operate in a cloud computing environment, as depicted in FIGS. 5 and 6.

The user computing device 160 represents a computing device that includes a user interface, for example, a graphical user interface (GUI) 162 that displays the received tracking data from the tracking application 152. GUI 162 represents one or more user interfaces for sending and receiving information from the application server 150 and the tracking application 152. GUI 162 may be, for example, a web browser, an application, or other types of GUIs for communication between the user computing device 160, application server 150 and the tracking application 152, via the network 120.

The user computing device 160 may be any type of computing devices that are capable of connecting to network 120, for example, a laptop computer, tablet computer, netbook computer, personal computer (PC), a desktop computer, a smart phone, or any programmable electronic device supporting the functionality required by one or more embodiments of the invention. The user computing device 160 may include internal and external hardware components, as depicted and described in further detail below with respect to FIG. 4. In other embodiments, the user computing device 160 may operate in a cloud computing environment, as depicted in FIGS. 5 and 6.

The tracking application 152 receives the tracking data from tracking modules 137, 147, 177, and 187. The tracking data contains data about a plurality of transactions processed by applications 135, 145, 175, and 185, where each of the plurality of transactions is composed of a plurality of subtransactions. The tracking application 152 calculates a parallelization metric for each of the plurality of transactions, which will be described in further detail below, and is able to calculate an average for the parallelization metric for the plurality of transactions.

The tracking application 152 will calculate the parallelization metric for each of the transaction of the plurality of transactions. The tracking application 152 calculates the parallelization metric for each transaction, based on, a longest response time for one subtransaction out of plurality of subtransaction that make up a single transaction, the sum of the response times for all of the subtransactions that make up the single transaction from the received tracking data, and the actual execution time for the transaction.

Figure 3:
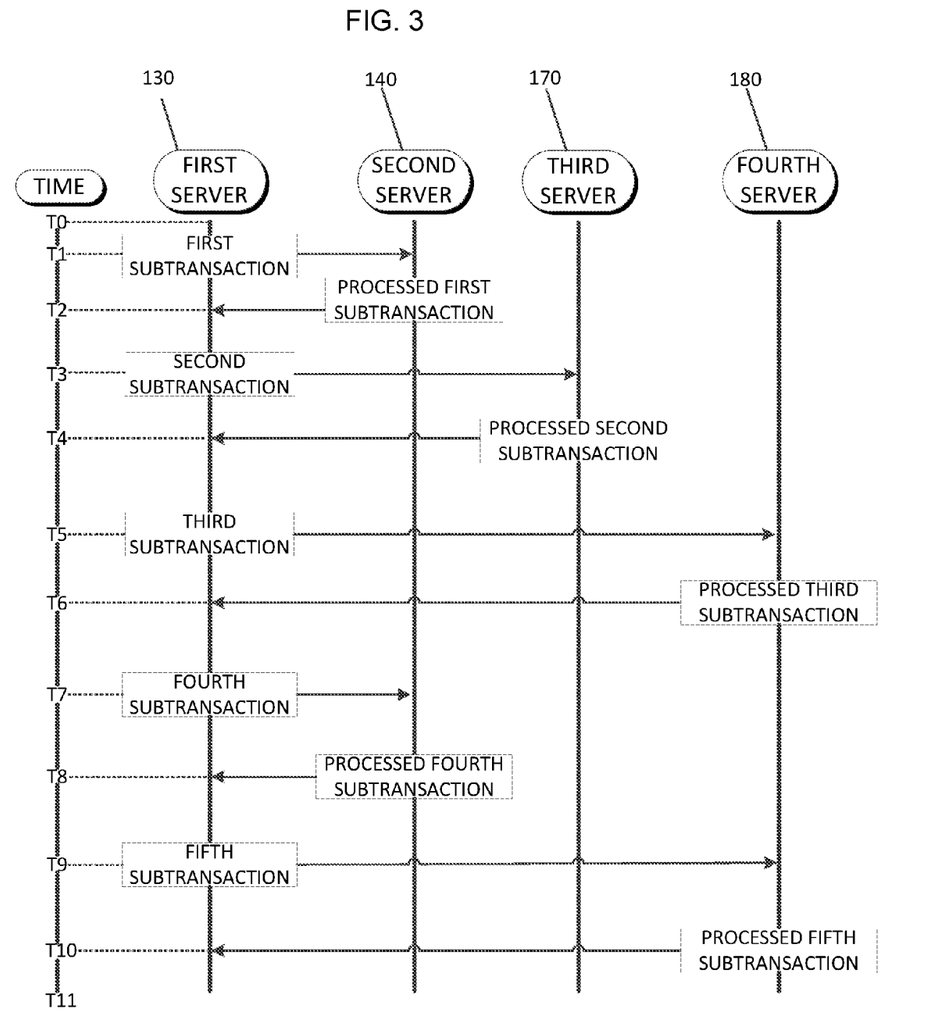
FIG. 3 is a message flow diagram depicting exemplary communications between four servers.

In embodiments of the invention, each transaction that application 135 of the first server 130 executes is composed of a plurality of subtransactions. In an exemplary embodiment, a transaction that application 135 of the first server 130 executes is composed of a plurality of subtransactions that are sent to one of the second server 140, the third server 170, and the fourth server 180. The longest response time for one subtransaction is equal to the response time, as measured from the time a subtransaction is transmitted by the first server 130 to an application on another application server, to the time the results of the subtransaction are received by the first server 130, for the longest single substransaction of the plurality of substransactions to complete the transaction. The sum of the response times is equal to the sum of all the response times for all of the substransactions of the plurality of substransactions to complete the transaction. FIG. 3 is a message flow diagram depicting exemplary communications between four servers that can be used to show how the different response times are determined.

FIG. 3 is an exemplary message flow diagram of the transactional communications between the first server 130, the second server 140, the third server 170, and the fourth server 180 but the message flow diagram can also be considered show the exemplary communications between applications 135, 145, 175, and 185. At time T0 the first server 130 starts the transaction process that is composed of five subtransactions. The first server 130 sends the first subtransaction, (i.e. the subtransaction has been completely sent) to the second server 140 at time T1. At time T2 the first server 130 finishes receiving the processed first subtransaction from the second server 140. Therefore, the time required to process the first subtransaction is the difference between times T2 and T1. At time T3 the first server 130 sends the second subtransaction to the third server 170 and at time T4 the first server finishes receiving the processed second subtransaction from the third server 170. The number of subtransactions that need to be processed between the first sever 130, the second server 140, the third server 170, and the fourth server 180 may vary in different instances. A time delay for when the second subtransaction is sent by the first server 130 is the difference between time T3 when the second transaction is sent and time T2 when the first server 130 received the processed first transaction.

Similarly, the time required to process the third subtransaction is the difference between times T6 and T5, the time required [4th and 5th subtransactions].

The first server 130 transmits the five subtransactions to the second server 140, the third server 170 and the fourth server 180, respectively, so that the subtransactions would be processed at the same time, i.e. the ideal conditions. The longest response time is equal to the response time for a single substransaction that requires the most amount of time out of the response times out each of the plurality of substransactions to complete the transaction.

When the first server 130 sends out one subtransaction at a time to be processed and the first server 130 does not sends the next subtransaction until it receives the previous subtransaction that has been processed, thus servers 130, 140, 170, and 180 would be processing the transaction in series, i.e. the worst case conditions.

Referring back to FIG. 1, the tracking application 152 receives the tracking data from the tracking modules 137, 147, 177, 187 to calculate the longest response time for one subtransaction out of the plurality of subtransactions that make up the single transaction and sum of the response times for all of the subtransactions that form the single transaction, the actual execution time to complete the transaction, and the parallelization metric, described in more detail below, from the received tracking data. Table 1 is an example of tracking data that the tracking application 152 may receive from the tracking modules 137, 147, 177, and 187.

TABLE 1

| EVENT (or data record number) | SOURCE PROGRAM | TYPE OF CALL | TARGET PROGRAM | TIME STAMP |
|---|---|---|---|---|
| 1 | 1$^{st}$ Application | STARTS | | 10:00:00 |
| 2 | 1$^{st}$ Application | CALLS | 2$^{nd}$ Application | 10:00:05 |
| 3 | 2$^{nd}$ Application | RETURNS TO | 1$^{st}$ Application | 10:00:10 |
| 4 | 1$^{st}$ Application | CALLS | 3$^{rd}$ Application | 10:00:15 |
| 5 | 3$^{rd}$ Application | RETURNS TO | 1$^{st}$ Application | 10:00:20 |
| 6 | 1$^{st}$ Application | CALLS | 4$^{th}$ Application | 10:00:40 |
| 7 | 4$^{th}$ Application | RETURNS TO | 1$^{st}$ Application | 10:00:50 |
| 8 | 1$^{st}$ Application | STOPS | | 10:01:00 |

With respect to Table 1, the number of the application represents the applications 135, 145, 175, and 185 of each the servers 130, 140, 170, and 180, respectively. The tracking application 152 calculates the actual execution time by determining the amount of time to that is used to perform the necessary operations. For example, as illustrated by the example shown in Table 1, the actual execution time is the total time of the transaction from the application 135 of the first server 130 (using records 1 and 8) from STARTS to STOPS, which, in this example, is 10:01:00 minus 10:00:00, or 1 minute.

The tracking application calculates the response time for each of subtractions from each of the applications 145, 175, 185 took to send back the subtransaction that they each processed, respectively, (application 145=10:00:10 minus 10:00:05 or 5 seconds, application 175=10:00:20 minus 10:00:15 or 5 seconds, application 185=10:00:50 minus 10:00:40 or 10 seconds). The greatest of these is application 185 which is 10 seconds, thus this number represents the longest response time for one subtransaction out of plurality of subtransaction that comprise a single transaction.

The sum of time for applications 145, 175, and 185 is 5+5+10, which equals 20 seconds. This number is the time it would take to run the three subtransactions calls if they were called one after another, thus this number represents the sum of the response times for all of the subtransactions that form the single transaction.

The tracking application 152 calculates the parallelization metric using the following equation:

$$C=((A-L)/(A-S))*100\% \quad (1)$$

wherein S is the longest response time for one subtransaction out of plurality of subtransaction that comprise a single transaction, L is the sum of the response times for all of the subtransactions that form the single transaction, A is the actual execution time of the transaction, and C is the parallelization metric. For example, based on the tracking data in Table 1, the parallelization metric is calculated to be C=80%.

Larger calculated parallelization metrics indicate that the transactions are executing at a higher level of parallelization. The best case scenario is when the calculated parallelization metric is 100 and the worst case scenario is when the parallelization metric is 0. The above example illustrates how the parallelization metric is calculated for a singular transaction, but the tracking application 152 calculates the parallelization metric for a plurality of transaction and determines the parallelization metric average. The parallelization metric average illustrates how well the applications 135, 145, 175, and 185 of each the servers 130, 140, 170, and 180, respectively, are operating in a parallel fashion with respect to execution of the tracked transactions.

The GUI 162 displays the average parallelization metric to a user to illustrate the processing environment for the plurality of transactions. The GUI 162 may display the average parallelization metric in different colors to reflect how well the transactions are executing in parallel. For example, if the average parallelization metric falls within the range of about 0 to 50, the GUI 162 may display the average parallelization metric in red to indicate that applications may lack subtasking or multi-threading implementation since the average parallelization metric is low and there are opportunities for improvement with regard to transactional parallelization. For example, if the average parallelization metric falls within the range of about 51 to 75, the GUI 162 will display the average parallelization metric in yellow to indicate that the applications are communicating somewhat in parallel, but there might be a subtasking or threading problem. For example, if the average parallelization metric falls within the range of about 76 to 100, the GUI 162 will display the average parallelization metric in green to indicate that the applications are communicating in parallel without any issues.

Figure 2:
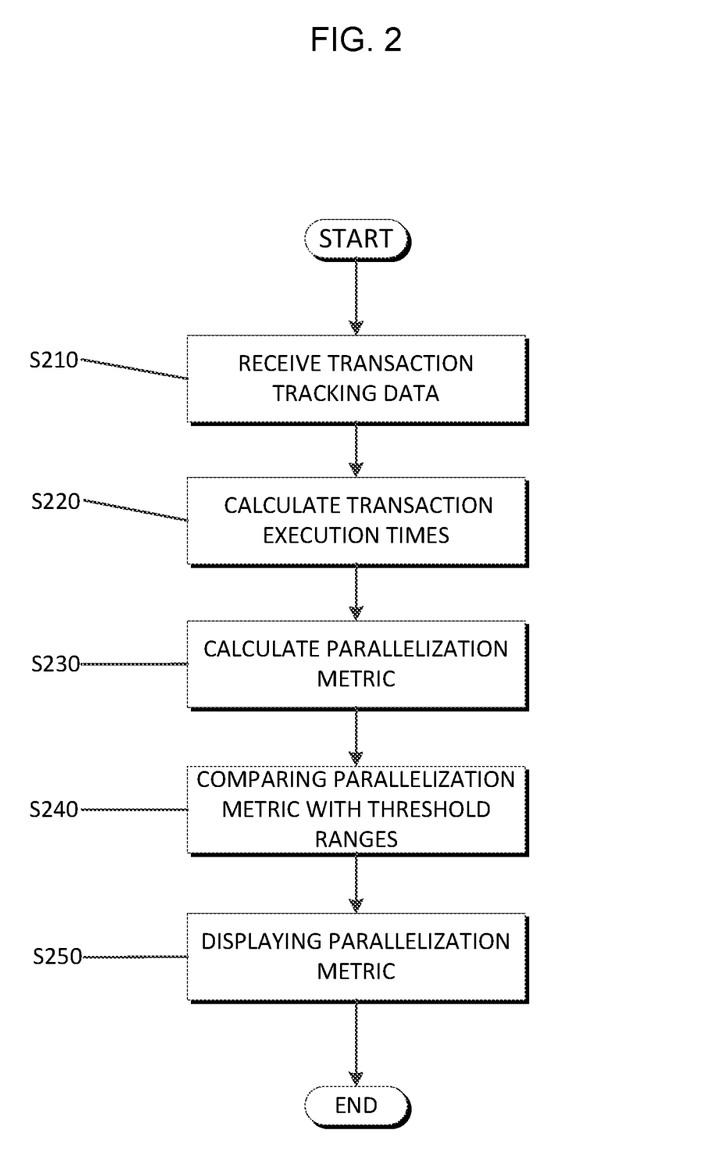
FIG. 2 is a flowchart depicting operational steps of determining transaction parallelization metric, in accordance with an embodiment of the present invention.

FIG. 2 is a flowchart depicting operational steps of determining transaction parallelization metric, in accordance with an embodiment of the present invention.

The tracking application 152 receives transaction tracking data from the tracking modules 137, 147, 177, and 187 (S210). The tracking application 152 calculates the shortest possible execution time, the largest possible execution time, and the actual execution time from the received tracking data (S220). The tracking application 152 calculates the parallelization metric for each of a plurality of transactions and calculates an average parallelization metric (S230) and compares the average parallelization metric to the threshold ranges (S240). The GUI 162 displays the calculated average parallelization metric based on the comparison (S250).

Figure 4:
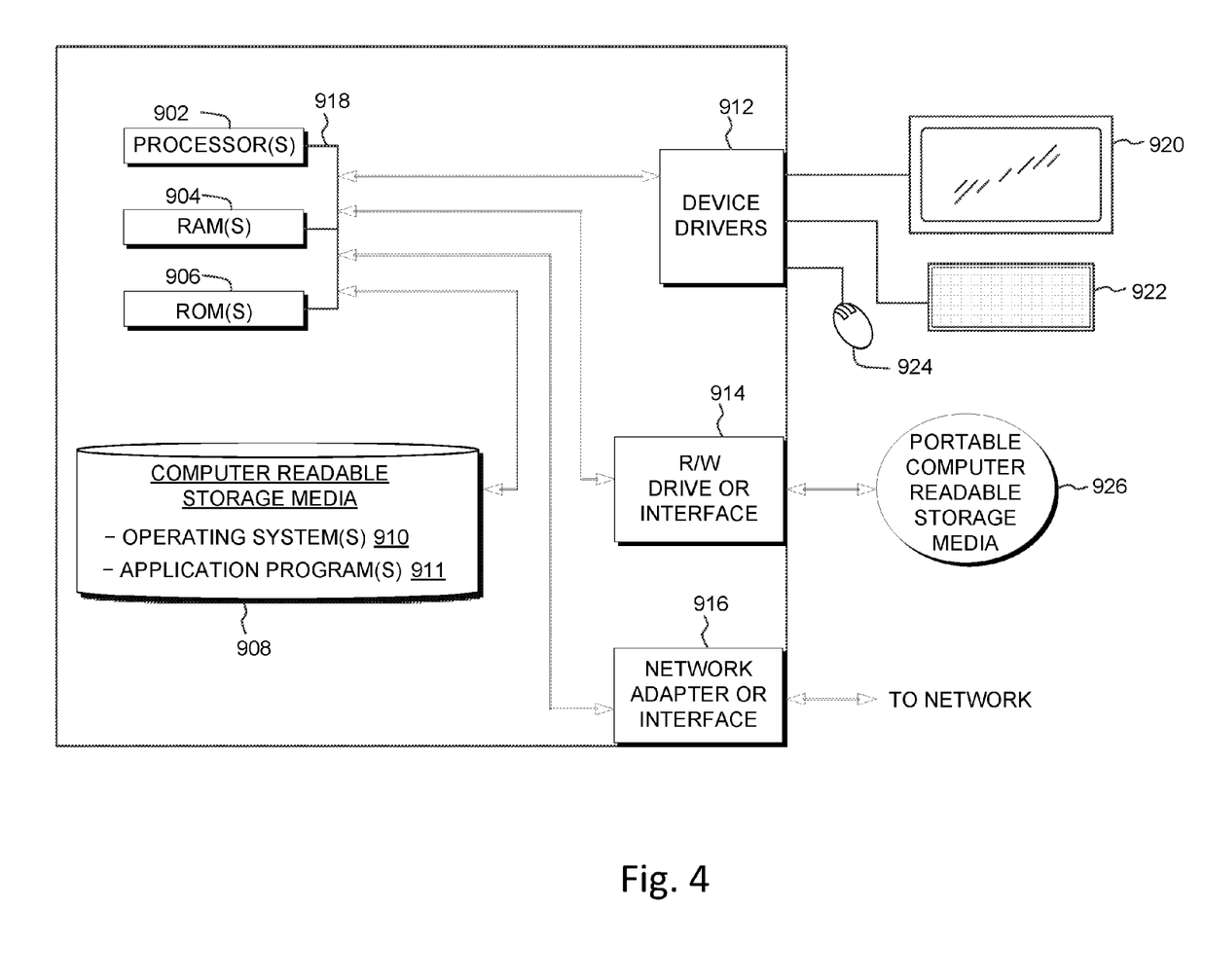
FIG. 4 is a block diagram of components of a computing device of the secure communication systems of FIG. 1, in accordance with embodiments of the present invention.

FIG. 4 depicts a block diagram of components of user computing device 160 of the system for determining transacting parallelization metric 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

User computing devices 160 and/or servers 130, 140, and application server 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, tracking application 152 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing devices 160 and/or servers 130, 140, and application server 150 may also include a R/W drive or interface 914 to read from and write to one or more portable computer readable storage media 926. Application programs 911 on the user computing devices 160 and/or servers 130, 140, and application server 150 may be stored on one or more of the portable computer readable storage media 926, read via the respective R/W drive or interface 914 and loaded into the respective computer readable storage media 908.

User computing devices 160 and/or servers 130, 140, and application server 150 may also include a network adapter or interface 916, such as a TCP/IP adapter card or wireless communication adapter (such as a 4G wireless communication adapter using OFDMA technology). Application programs 911 on the user computing devices 160 and/or servers 130 and 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing devices 160 and/or servers 130, 140, and application server 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system for determining transacting parallelization metric 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for calculating an average parallelization metric, the method comprising:

receiving, by a computer, tracking data that tracks how at least one server processes a plurality of transactions over a time frame, wherein each of the plurality of transactions is comprised of a plurality of subtransactions, wherein the tracking data is comprised of response times for a plurality of subtransactions for each of the plurality of transactions, and wherein each response time is measured from when the subtransaction is sent out to be proceed to when the processed subtransaction is returned;

calculating, by the computer, a parallelization metric for each of the plurality of transactions;

calculating, by the computer, the average parallelization metric from the calculated parallelization metrics for each of the plurality of transactions: and displaying, by the computer, the average parallelization metric;

wherein the parallelization metric is calculated for each of the plurality of transactions, further comprises, for each of the plurality of transactions:

calculating, by the computer, a sum of the response times for all of the subtransactions for one transaction;

determining, by the computer, a longest response time for one subtransaction out of response times for all of plurality of subtransaction that comprise the one transaction;

calculating, by the computer, an actual execution time for the transaction based on the time when the transaction starts to when the transaction has been completed; and calculating, by the computer, the parallelization metric for the one transaction based on the calculated sum of the response times for all of the subtransactions for one transaction, the longest response time for one subtransaction out of response times for all of plurality of subtransaction that comprise the one transaction, and the calculated actual execution time for the transaction based on the time when the transaction starts to when the transaction has been completed.

2. The method of claim 1, wherein the parallelization metric for each transaction of the plurality of transactions is calculated using the following equation:

$$C=((A-L)/(A-S))*100\%$$

wherein S is the longest response time for one subtransaction out of plurality of subtransaction that comprise a single transaction, L is the sum of the response times for all of the subtransactions that form the single transaction, A is the actual execution time of the transaction.

3. The method of claim 1, wherein displaying, by the computer, the average parallelization metric, further comprises:

comparing, by the computer, the calculated average parallelization metric to a threshold range;

displaying, by the computer, the average parallelization metric in a specific color depending on how the calculated average parallelization metric compared to the threshold range.

4. The method of claim 3, wherein displaying, by the computer, the average parallelization metric in a specific color depending on how the calculated average parallelization metric compared to the threshold range, further comprises:

displaying, by the computer, the average parallelization metric in red if the average parallelization metric falls within the range of 0 to 50%, the average parallelization metric in yellow if the average parallelization metric falls within the range of 51 to 75%, or the average parallelization metric in green if the average parallelization metric falls within the range of 76 to 100%.

5. The method of claim 1, wherein the tracking data that tracks how at least one server processes a plurality of transactions over a time frame, wherein each of the plurality of transactions is comprised of a plurality of subtransactions, further comprises:

wherein the plurality of subtransactions for each of the plurality of transactions is sent to, processed by, and returned by one server.

6. The method of claim 1, wherein the tracking data that tracks how at least one server processes a plurality of transactions over a time frame, wherein each of the plurality of transactions is comprised of a plurality of subtransactions, further comprises:

wherein each of the plurality of subtransactions for each of the plurality of transactions is sent to, processed by, and returned to a plurality of different servers.

7. A computer program product for calculating an average parallelization metric for a plurality of transactions, the computer program product comprising:

one or more non-transitory computer-readable storage media and program instructions stored on the one or more non-transitory computer-readable storage media, the program instructions comprising:

receiving tracking data that tracks how at least one server processes the plurality of transactions over a time frame, wherein each of the plurality of transactions is comprised of a plurality of subtransactions, wherein the tracking data is comprised of response times for a plurality of subtransactions for each of the plurality of transactions, and wherein each response time is measured from when the subtransaction is sent out to be proceed to when the processed subtransaction is returned;

calculating a parallelization metric for each of the plurality of transactions;

calculating an-the average parallelization metric from the calculated parallelization metrics for each of the plurality of transactions; and displaying the average parallelization metric;

wherein the parallelization metric is calculated for each of the plurality of transactions, further comprises, for each of the plurality of transactions:

calculating a sum of the response times for all of the subtransactions for one transaction;

determining a longest response time for one subtransaction out of response times for all of plurality of subtransaction that comprise the one transaction;

calculating an actual execution time for the transaction based on the time when the transaction starts to when the transaction has been completed; and calculating the parallelization metric for the one transaction based on the calculated sum of the response times for all of the subtransactions for one transaction, the longest response time for one subtransaction out of response times for all of plurality of subtransaction that comprise the one transaction, and the calculated actual execution time for the transaction based on the time when the transaction starts to when the transaction has been completed.

8. The computer program product of claim 7, wherein the parallelization metric for each transaction of the plurality of transactions is calculated using the following equation:

$$C=((A-L)/(A-S))*100\%$$

wherein S is the longest response time for one subtransaction out of plurality of subtransaction that comprise a single transaction, L is the sum of the response times for all of the subtransactions that form the single transaction, A is the actual execution time of the transaction.

9. The computer program product of claim 7, wherein displaying the average parallelization metric, further comprises:
   comparing the calculated average parallelization metric to a threshold range;
   displaying the average parallelization metric in a specific color depending on how the calculated average parallelization metric compared to the threshold range.

10. The computer program product of claim 9, wherein displaying the average parallelization metric in a specific color depending on how the calculated average parallelization metric compared to the threshold range, further comprises:
   displaying the average parallelization metric in red if the average parallelization metric falls within the range of 0 to 50%, the average parallelization metric in yellow if the average parallelization metric falls within the range of 51 to 75%, or the average parallelization metric in green if the average parallelization metric falls within the range of 76 to 100%.

11. The computer program product of claim 7, wherein the tracking data that tracks how at least one server processes a plurality of transactions over a time frame, wherein each of the plurality of transactions is comprised of a plurality of subtransactions, further comprises:
   wherein the plurality of subtransactions for each of the plurality of transactions is sent to, processed by, and returned by one server.

12. The computer program product of claim 7, wherein the tracking data that tracks how at least one server processes a plurality of transactions over a time frame, wherein each of the plurality of transactions is comprised of a plurality of subtransactions, further comprises:
   wherein each of the plurality of subtransactions for each of the plurality of transactions is sent to, processed by, and returned to a plurality of different servers.

13. A computer system for calculating an parallelization metric, the computer system comprising:
   one or more computer processors, one or more computer-readable storage media, and program instructions stored on one or more of the computer-readable storage media for execution by at least one of the one or more processors, the program instructions comprising:
      receiving tracking data that tracks how at least one server processes a plurality of transactions over a time frame, wherein each of the plurality of transactions is comprised of a plurality of subtransactions, wherein the tracking data is comprised of response times for a plurality of subtransactions for each of the plurality of transactions, and wherein each response time is measured from when the subtransaction is sent out to be proceed to when the processed subtransaction is returned;
      calculating a parallelization metric for each of the plurality of transactions;
      calculating the average parallelization metric from the calculated parallelization metrics for each of the plurality of transactions; and
      displaying the average parallelization metric;
      wherein the parallelization metric is calculated for each of the plurality of transactions, further comprises, for each of the plurality of transactions:
         calculating a sum of the response times for all of the subtransactions for one transaction;
         determining a longest response time for one subtransaction out of response times for all of plurality of subtransaction that comprise the one transaction;
         calculating an actual execution time for the transaction based on the time when the transaction starts to when the transaction has been completed; and
         calculating the parallelization metric for the one transaction based on the calculated sum of the response times for all of the subtransactions for one transaction, the longest response time for one subtransaction out of response times for all of plurality of subtransaction that comprise the one transaction, and the calculated actual execution time for the transaction based on the time when the transaction starts to when the transaction has been completed.

14. The computer system of claim 13, wherein the parallelization metric for each transaction of the plurality of transactions is calculated using the following equation:

$$C=((A-L)/(A-S))*100\%$$

wherein S is the longest response time for one subtransaction out of plurality of subtransaction that comprise a single transaction, L is the sum of the response times for all of the subtransactions that form the single transaction, A is the actual execution time of the transaction.

15. The computer system of claim 13, wherein displaying the average parallelization metric, further comprises:
   comparing the calculated average parallelization metric to a threshold range;
   displaying the average parallelization metric in a specific color depending on how the calculated average parallelization metric compared to the threshold range.

16. The computer system of claim 15, wherein displaying the average parallelization metric in a specific color depending on how the calculated average parallelization metric compared to the threshold range, further comprises:
   displaying the average parallelization metric in red if the average parallelization metric falls within the range of 0 to 50%, the average parallelization metric in yellow if the average parallelization metric falls within the range of 51 to 75%, or the average parallelization metric in green if the average parallelization metric falls within the range of 76 to 100%.

17. The computer system of claim 13, wherein the tracking data that tracks how at least one server processes a plurality of transactions over a time frame, wherein each of the plurality of transactions is comprised of a plurality of subtransactions, further comprises:
   wherein the plurality of subtransactions for each of the plurality of transactions is sent to, processed by, and returned by one server.

18. The computer system of claim 13, wherein the tracking data that tracks how at least one server processes a plurality of transactions over a time frame, wherein each of the plurality of transactions is comprised of a plurality of subtransactions, further comprises:

wherein each of the plurality of subtransactions for each of the plurality of transactions is sent to, processed by, and returned to a plurality of different servers.

\* \* \* \* \*